(12) United States Patent
Marechal et al.

(10) Patent No.: US 9,728,106 B2
(45) Date of Patent: Aug. 8, 2017

(54) DEVICE FOR SIMULATING THE INGESTION OF CHUNKS OF ICE BY AN ENGINE

(71) Applicant: SNECMA, Paris (FR)

(72) Inventors: Ewen Marechal, Paris (FR); Jean-Yves Perrin, Combs la Ville (FR)

(73) Assignee: SNECMA, Paris (FR)

( * ) Notice: Subject to any disclaimer, the term of this patent is extended or adjusted under 35 U.S.C. 154(b) by 283 days.

(21) Appl. No.: 14/413,025

(22) PCT Filed: Jun. 21, 2013

(86) PCT No.: PCT/FR2013/051451
§ 371 (c)(1),
(2) Date: Jan. 6, 2015

(87) PCT Pub. No.: WO2014/006297
PCT Pub. Date: Jan. 9, 2014

(65) Prior Publication Data
US 2015/0206458 A1    Jul. 23, 2015

(30) Foreign Application Priority Data
Jul. 6, 2012 (FR) .................................. 12 56524

(51) Int. Cl.
*G01M 15/14* (2006.01)
*G09B 25/00* (2006.01)
(Continued)

(52) U.S. Cl.
CPC ........... *G09B 25/00* (2013.01); *F01D 21/003* (2013.01); *F02C 3/30* (2013.01)

(58) Field of Classification Search
USPC ............... 73/112.01, 112.03, 118.01, 118.02, 73/118.03
See application file for complete search history.

(56) References Cited

U.S. PATENT DOCUMENTS 6,216,443 B1    4/2001    Utamura
6,286,301 B1    9/2001    Utamura
(Continued)

FOREIGN PATENT DOCUMENTS

DE    198 31 425 A1    1/2000
EP    0 781 909 A2    7/1997
(Continued)

OTHER PUBLICATIONS

International Search Report issued Sep. 5, 2013, in PCT/FR2013/051451, filed Jun. 21, 2013.
(Continued)

*Primary Examiner* — Eric S McCall
(74) *Attorney, Agent, or Firm* — Oblon, McClelland, Maier & Neustadt, L.L.P.

(57) ABSTRACT

A device for simulating an ingestion of chunks of ice by an engine, including: a main tank forming a cavity for a fuel, and connected to an inlet of the engine by a pipe; an injection system including an injection member arranged in the pipe; a secondary tank forming a cavity for a fuel, which tank is connected to the injection system by a selector member; and a reservoir connected firstly to a reserve of water and secondly to the injection system via the selector member. The selector member is configured to place the injection system selectively in communication with the secondary tank or with the reservoir to inject a determined quantity of water into the engine.

14 Claims, 4 Drawing Sheets

(51) Int. Cl.
*F01D 21/00* (2006.01)
*F02C 3/30* (2006.01)

(56) References Cited

U.S. PATENT DOCUMENTS

| | | | |
|---|---|---|---|
| 6,357,236 B1 | 3/2002 | Utamura | |
| 6,378,284 B1 | 4/2002 | Utamura | |
| 6,598,401 B1 | 7/2003 | Utamura | |
| 9,134,196 B2 * | 9/2015 | Meis | B64D 15/04 |
| 2002/0026783 A1 | 3/2002 | Utamura | |
| 2003/0029157 A1 | 2/2003 | Utamura | |
| 2003/0196439 A1 | 10/2003 | Utamura | |
| 2007/0022734 A1 | 2/2007 | Utamura | |
| 2007/0186631 A1 * | 8/2007 | Clark | F01D 21/003 73/118.03 |
| 2008/0302081 A1 * | 12/2008 | Snell | F01D 21/10 60/39.093 |
| 2012/0032809 A1 | 2/2012 | Comotto et al. | |
| 2013/0158831 A1 * | 6/2013 | Djelassi | F02C 9/28 701/100 |
| 2013/0239670 A1 * | 9/2013 | Meis | F25C 1/00 73/118.03 |

FOREIGN PATENT DOCUMENTS

| | | |
|---|---|---|
| FR | 2 944 216 A1 | 10/2010 |
| WO | 2012/069745 A1 | 5/2012 |

OTHER PUBLICATIONS

French Preliminary Search Report issued Mar. 28, 2013 in Patent Application No. 1256524 (with English translation of categories of cited documents).

International Search Report issued Sep. 5, 2013 in PCT/FR2013/051451 (with English translation of categories of cited documents).

* cited by examiner

DEVICE FOR SIMULATING THE INGESTION OF CHUNKS OF ICE BY AN ENGINE

BACKGROUND OF THE INVENTION

Field of the Invention

The invention generally relates to the simulation of phenomena of the chunks of ice type in the supply of an engine, in particular on the fuel system of the engine.

Description of the Related Art

The fuel system is a portion of the engine comprising, in the direction of the circulation of the fuel, a low-pressure pump that receives fuel coming from a reservoir by the intermediary of a boost pump. At the outlet of the low-pressure pump, the fuel passes through one or several heat exchangers and a main filter, then penetrates into a high-pressure pump designed to inject the fuel into the combustion chamber by the intermediary of suitable injectors and vaporise it in conditions that are conducive to its combustion.

In most countries, this system is highly regulated, in particular at the level of its mechanical resistance.

In particular, the current standards are very demanding with regards to the robustness of the fuel systems faced with the phenomena of freezing and the formation of chunks of ice, in order to attempt to prevent the obstruction by the ice of certain portions of the fuel system such as the heat exchanger.

Icing tests have already been carried out with a device for injecting water into the engine, comprising means adapted to carry out a pre-mixing of water and of fuel in a tank, an injection nozzle, and a regulation system designed to regulate the injection and pre-mixing steps. In order to form an ice slurry (which is a two-phase mixture of aqueous liquid and of ice, comprising both fuel and water in the form of fluid and ice crystals), the injection nozzle comprises a turbulator designed to increase the turbulence of the water before spraying by the injection nozzle into the fuel system.

However, during these tests, the specified concentration does not exceed 300 ppm (parts per million, by volume) in order to provide a homogeneous mixture of the water and of the fuel, and corresponds to the concentrations of water naturally present in the fuel. This is therefore insufficient to simulate a possible detaching of chunks of ice in a fuel system. Moreover, this injection device is well suited for injection times of a few tens of minutes, as the regulation system requires a few seconds in order to start the injection and that the water is injected in several times in very small quantities. However, in order to simulate in particular the detaching of chunks of ice penetrating into the fuel system, it is sought to simulate an injection of the entire volume of water in a very short period of time, of a magnitude of a few seconds, which cannot be obtained with this water injection device. In addition, the flow in the stream of fuel oscillates during the entire duration of the test because the flow rate at the outlet of the nozzle decreases substantially at the time of the water injections. Finally, the recirculation zones created around the injection nozzle and the small size of the water droplets sprayed which are captured by these recirculation zones favour the accumulation of a deposit of ice on the head of the injection nozzle all throughout the test, which, on the one hand risks obstructing the injection nozzle according to the flow rate and the temperature of the water and of the fuel, and on the other hand reduces in an undetermined way and in an undeterminable way the quantity of water that can finally penetrate into the engine.

BRIEF SUMMARY OF THE INVENTION

An objective of the invention is therefore to propose a device that makes it possible to create a disturbance of the chunks of ice type in the supplying of an engine, which is capable of injecting water into the fuel system of the engine in precise defined conditions. In particular, the objective of the invention is to propose a device capable of injecting a very precise volume of water in a very short injection time into a stream of fuel that has a flow rate and a temperature that are well determined and stable.

Moreover, the invention also has for object to propose a device for evaluating the resistance of an engine to chunks of ice, which is able to form an ice slurry in the stream of fuel having defined structural characteristics, such as in particular a small size of ice crystals, more preferably less than 2 mm, and a texture comprised of 50% water and 50% fuel.

For this, the invention proposes a device for simulating an ingestion of chunks of ice by an engine, comprising:
- a main tank forming a cavity for a fuel, and connected to an inlet of the engine by a pipe,
- an injection system, comprising an injector arrange in the pipe,
- a secondary tank forming a cavity for a fuel, connected to the injection system par a selector, and
- a reservoir, connected on the one hand to a water reserve and on the other hand to the injection system by the intermediary of the selector, wherein the selector is designed to place the injection system selectively in communication with the secondary tank or the reservoir in order to inject a determined quantity of water into the engine.

- the secondary tank is connected to a pressurising member,
- the device further comprises a system for regulating the fuel flow rate between the secondary tank and the selector,
- the selector comprises a three-way valve that has three orifices, with a first orifice being connected to an injection system, a second orifice being connected to the secondary tank, and a third orifice being connected to the reservoir,
- the water reserve is subjected to a determined pressure, and further comprising a filling member designed to connect the reservoir to a source of said determined pressure,
- the filling member is furthermore in communication with the secondary tank and is adapted to place the reservoir selectively in communication with the source of predetermined pressure or the secondary tank,
- the filling member comprises a three-way valve that has three orifices, a first orifice being connected to the source of predetermined pressure, with a second orifice being connected to the secondary tank, and a third orifice being connected to the reservoir,
- the device further comprises a valve arranged between the reservoir and the water reserve, adapted to allow or prohibit the circulation of water between the water reserve and the reservoir,
- the device further comprises a system for evaluating the water injected into the pipe and arriving at the inlet of the engine,
- the evaluation system comprises a filter arranged on the inlet of the engine designed to recover the water injected into the pipe,
- the device further comprises a container for recovering fluids, the injection system comprises an injection nozzle comprising an injection head with a tapered shape and having at its centre an injection orifice, and a turbulator, wherein the turbulator is placed in abutment against a wall of the inner space of the injection head, and is separated from the injection orifice by an injection channel, and wherein the wall of the inner space is of tapered shape.

According to a second aspect, the invention also proposes an injection nozzle comprising an injection head of flat tapered shape and having in its centre an injection orifice, and a turbulator.

Other optional and non-restricted characteristics of the injection nozzle are the following:
the turbulator is placed in abutment against a wall of an inner space of the injection head, in such a way as to be separated from the injection orifice by an injection channel, and
the wall of the inner space is of tapered shape.

BRIEF DESCRIPTION OF THE SEVERAL VIEWS OF THE DRAWINGS

Other characteristics, purposes and advantages of this invention shall appear better when reading the following detailed description, made in reference to the annexed figures provided by way of a non-restricted example and wherein.

DETAILED DESCRIPTION OF THE INVENTION

Figure 1A:
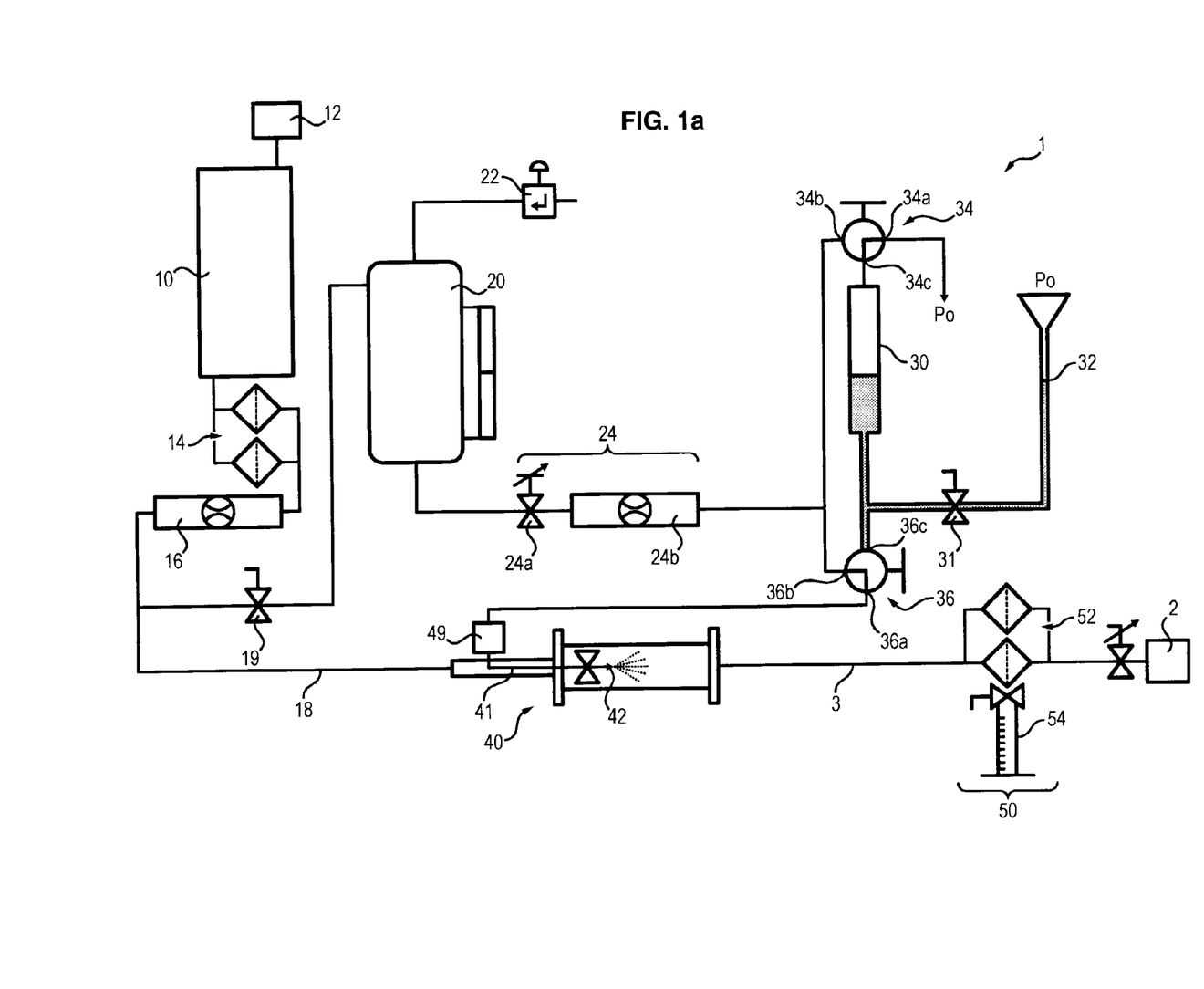
FIGS. 1a to 1c show three configurations of an embodiment of a hydraulic circuit of a device for simulating an ingestion of chunks of ice by an engine in accordance with the invention.
Figure 1B:
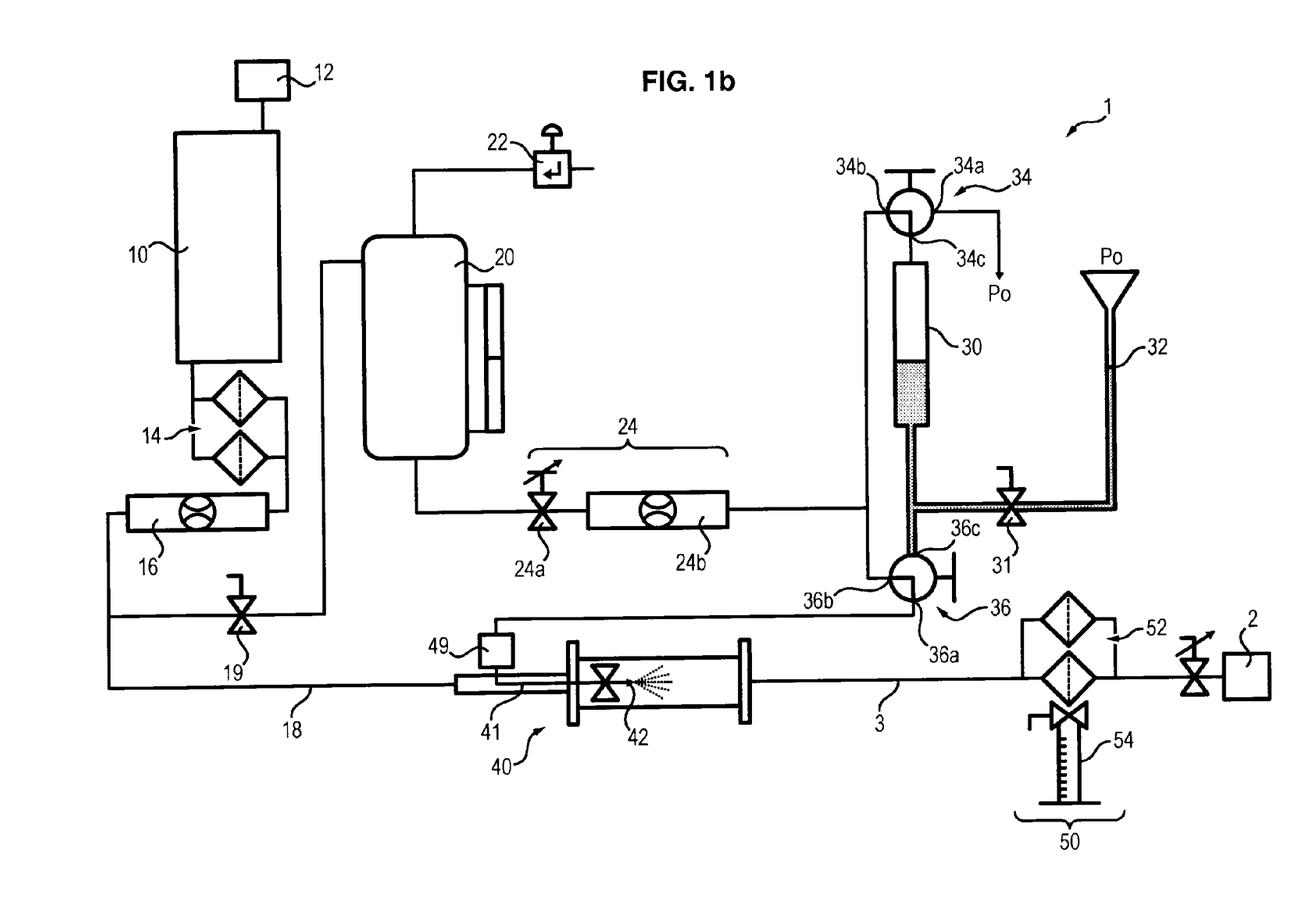
Figure 1C:
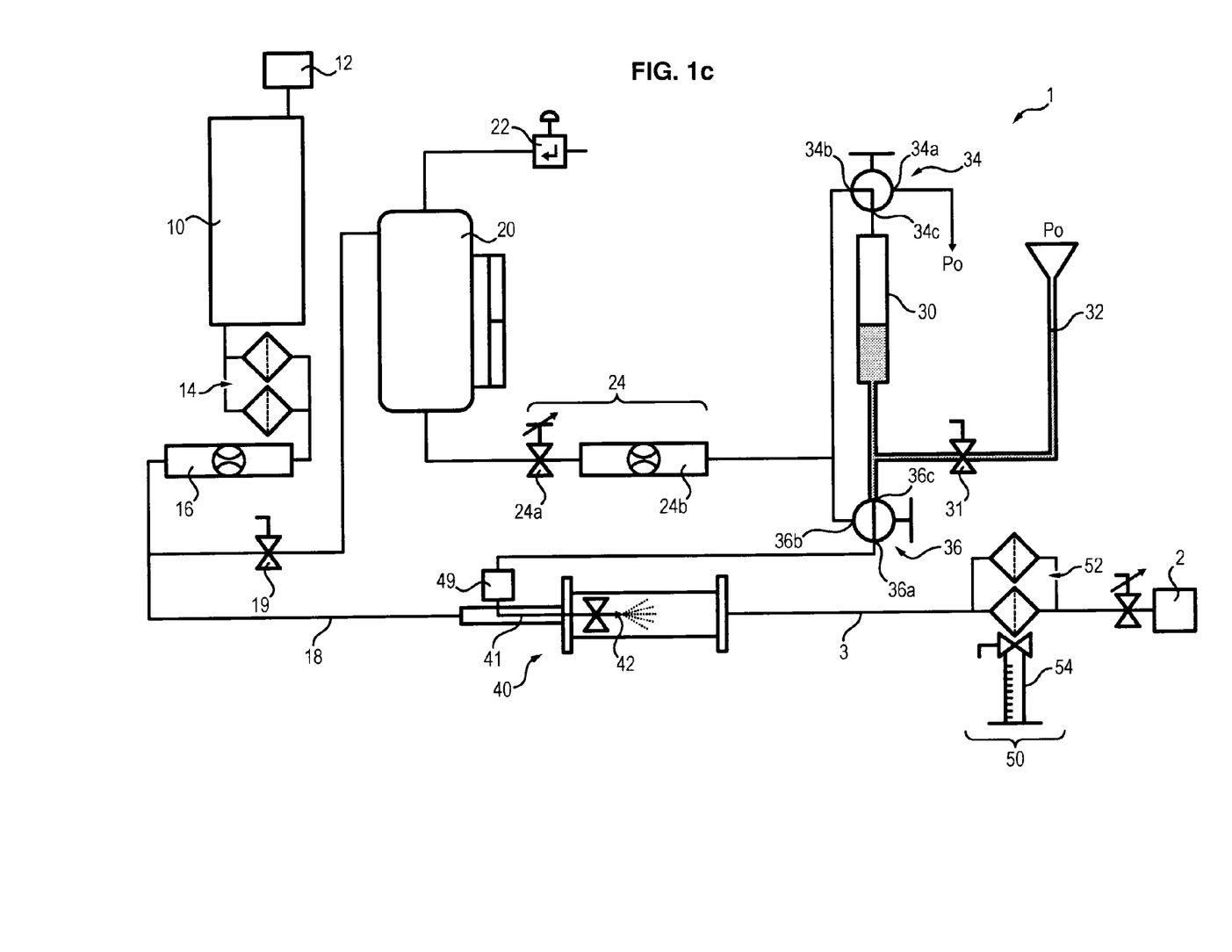

A device 1 for simulating an ingestion of chunks of ice by an engine comprises a main tank 10, designed to receive fuel, such as kerosene, an engine 2, and lines connecting the main tank 10 to an inlet of the engine 2 (pump).

The main tank 10 comprises a cooling device 12, designed to cool the fuel that it contains to a determined temperature, for example between −45° C. and −5° C. For example, the cooling device 12 can use nitrogen under pressure as a coolant. The main tank 10 is furthermore connected to a source of pressure, designed to send fuel from the main tank 10 to the inlet of the engine 2 in the form of a main stream of fuel at a determined flow rate, between for example 1000 and 3500 kg/h. The flow rate injected into the lines depends however on the type of engine tested and on the engine speed simulated (for example a take-off speed vs. a cruising speed for an aircraft).

The flow rate of the fuel injected into the motor 2 from the main tank 10 can be adjusted, for example via the source of pressure, and measured by means of a flowmeter 16. Here, this is a mass flowmeter. Alternatively, it can also be a volume flowmeter.

The main tank 10 is connected to at least one filter 14 designed to filter the water that may be present in the fuel contained in the main tank 10.

The cooled fuel is then injected into the engine 2 by the intermediary of a pipe 3 inserted into the lines connecting the main tank 10 to the inlet of the engine 2, downstream of the filter 14. The lines can moreover be angled, in particular before the inlet of the pipe 3, in order to better simulate the pipes of motorised equipment.

The device 1 further comprises, between the main tank 10 and the engine 2:
an injection system 40, comprising an injector 42 arranged in the pipe 3,
a secondary tank 20 forming a cavity for fuel, identical to the fuel of the main tank, and connected to the injection system 40 by a selector 36, and
a reservoir 30, connected on the one hand to a reserve of demineralised water 32 and on the other hand to the injection system 40 by the intermediary of the selector 36.

The secondary tank 20 is provided with a pressurising member 22, designed to place the fuel contained in the secondary tank 20 at a predetermined pressure P, of a magnitude from 0 to about 7 bars. Moreover, it is connected to the injection system 40 by the intermediary of a system for regulating the flow rate of fuel 24. The regulation system 24 can in particular comprise a flow regulator 24a as well as a flowmeter 24b, here a mass flowmeter, adapted to regulate and measure the flow rate of the fuel coming from the secondary tank between 12 and 30 kg/h.

The secondary tank 20 can be filled using the main tank 10 of fuel by opening a valve of the stopcock 19 type, or via a separate source of fuel. The fuel in the secondary tank 20 is at ambient temperature, and its volume is adapted to allow for supplying the injection system 40 with fuel during the test. The tank can for example comprise between 40L and 60 L of fuel.

The reservoir 30 is designed to receive a determined volume of fluid, comprising in particular the determined volume of water intended to be injected into the main stream of fuel by the intermediary of the injection system 40.

Here, the reservoir 30 can be filled by a system of communicating compartments. For this, the reservoir is connected to the water reserve 32 which is at a given pressure P0, by the intermediary of a valve of the stopcock 31 type. The reservoir 30 is furthermore connected on the one hand to a filling member 34 designed to place the reservoir 30 selectively in communication with a source of given pressure P0 or the secondary tank 20, and on the other hand to a selector designed to place the injection system 40 selectively in communication with the reservoir 30 or the secondary tank 20.

The given pressure P0 can for example be the ambient pressure.

The injection system 40 comprises an injection lance 41, connected to a first end at the selector 36 by the intermediary of lines, and on a second end at the injection nozzle 42. The injection lance 41 opens into the pipe 3 in such a way that the injection nozzle 42 is located in the main stream of fuel.

The injection nozzle 42 has for function to spray the injected water into the main stream of fuel.

The diameter of the injection nozzle 42 can be adapted according to the pressurisation of the secondary tank 20, in particular in order to be able to increase the flow rate of injection into the main stream of fuel.

Moreover, the injection system 40 can be provided with a heating member 49, arranged for example between the injection nozzle 42 and the selector 36. During the tests, the heating member 49 is turned off and does not heat the injection system 40. On the other hand, when the lance 41 or the injection nozzle 42 are obstructed by ice, the heating member 49 can heat the lance 41 via conduction in order to melt the imprisoned ice and clear the passage. The flow rate of fuel coming from the main tank 10 then being preferably cut off.

The filling member 34 can for example comprise a three-way valve, referred to as filling valve, arranged in the upper portion of the reservoir 30. The filling valve 34 comprises three orifices, with a first orifice 34a being connected to the source of ambient pressure P0, a second orifice 34b being connected to the outlet of the regulation system 24 of the secondary tank 20, and a third orifice 34c being connected in an upper zone of the reservoir 30. In this embodiment, the filling valve 34 can therefore have two configurations. In a first configuration, the first orifice 34a and the third orifice 34c are connected, with the second orifice 34b being closed, in such a way that the reservoir 30 is in communication with the source of ambient pressure P0. In a second configuration, the second orifice 34b and the third orifice 34c are connected, with the first orifice 34a being closed, in such a way that the reservoir 30 is in communication with the secondary tank 20.

The selector 36 can for example comprise a three-way valve, referred to as selection valve, arranged in the lower portion of the reservoir 30. The selection valve 36 comprises three orifices, a first orifice 36a being connected to the injection system 40, a second orifice 36b being connected to the outlet of the regulation system 24 of the secondary tank 20, and a third orifice 36c being connected in a lower zone of the reservoir 30. In this embodiment, the selection valve 36 can therefore also have two configurations. In a first configuration, the first orifice 36a and the second orifice 36b are connected, with the third orifice 36c being closed, in such a way that the secondary tank 20 is in communication with the injection system 40. In a second configuration, the first orifice 36a and the third orifice 36c are connected, with the second orifice 36b being closed, in such a way that the reservoir 30 is in communication with the injection system 40.

The configurations of the filling valve 34 and of the selection valve 36 therefore make it possible to fill the reservoir 30, either with water, or with fuel, and to select the fluid injected into the main stream of fuel by the injection system 40.

Indeed, when the valve 31 is open, the water reserve 32 and the reservoir 30 are in fluidic communication.

If the filling valve 34 and the selection valve are in the first configuration (FIG. 1a), wherein the second orifice 34b and the third orifice 36c are closed, the reservoir 30 communicates with the source of ambient pressure P0 and cannot be emptied via the selection valve 36. Consequently, the water reserve 32 and the reservoir 30 are both in fluidic communication and subjected to the same pressure P0, in such a way that the reservoir 30 can be filled with water according to the principle of communicating compartments, until its level is equal to the level of the reserve 32. When the determined volume of water in the reservoir 30 is reached, the valve 31 can then be closed.

The level of water in the reservoir 30 can therefore be defined precisely in such a way as to obtain a determined volume of water, according to the quantity of water that has to be injected into the pipe of the main stream of fuel. For example, the determined volume of water can be between 30 milliliters and 400 milliliters, typically between 80 and 90 milliliters.

However the volume of water that has to be injected into the main stream of fuel depends on the type of engine tested during the test and on the quantity of water that must be received by the engine, but must furthermore take any losses into account. For example, it is necessary to take into account lines wherein a portion of the volume is stored and necessarily injected with the volume of water stored in the reservoir 30.

As we shall see in more detail in what follows, the losses in the device 1 are very low and are primarily due to the dissolution of a portion of the water in the fuel. Consequently, the volume of water that has to be injected into the main stream of fuel is slightly greater than the volume of water desired at the inlet of the engine 2. For example, for a volume of water desired at the inlet of the engine 2 of 84 milliliters, the volume of water in the reservoir 30 must be of a magnitude of 90 to 92 milliliters.

In addition, when the selection valve 36 is in its first configuration wherein the third orifice 36c is closed, the secondary tank 20 is in fluidic communication with the injection system 40. Consequently, during the filling of the reservoir 30, not only the main tank injects fuel in the form of a main stream of fuel into the inlet of the engine 2, but furthermore the injection system 40 injects into this main valve fuel coming from the secondary tank 20.

During a test, the fuel coming from the main tank 10 is cooled and injected into the pipe 3 in order to form the main stream of fuel. In parallel to this cooling or later, the selection valve 36 is placed in its first configuration, so as to place in communication the secondary tank 20 and the injection system, and to close the third orifice 36c, with the filling valve able to be in its first configuration, or in its second configuration. Fuel coming from the secondary tank 20 is therefore injected via the injection system 40 into the main stream of fuel.

It is preferable to maintain the selection valve in its second configuration enough time for the temperature of the fuel coming from the main tank 10 to reach the desired temperature, for example between −45° C. and −5° C., so that the test conditions are reached at the moment of the injection of the water into the main stream of fuel. In this way, during this first step, the device 1 has the time to be stabilised in temperature, in pressure and in flow rate before the water is injected into the main stream of fuel.

If the reservoir 30 does not yet contain the determined volume of water, the reservoir of water is then filled by placing the filling valve 34 in its first configuration and by opening the valve 31, as indicated hereinabove.

Once the device 1 is stable, during a second step, the filling valve is then placed in its second configuration, in such a way that the first orifice 34a closes and the second orifice 34b opens, with the selection valve 36 remaining in its first configuration (FIG. 1b). The reservoir 30 is therefore cut off from the ambient pressure P0 and connected to the secondary tank 20, which is subjected to the pressure P. However, as the secondary tank 20 is in fluidic communication with the injection system 40, and the third orifice 36c being closed, no fuel fills the reservoir 30 and the injection system 40 continues to inject fuel coming from the secondary tank 20 into the main stream.

The flow rate of the fuel injected by the injection system 40 can be modulated by varying the pressure P of the secondary tank 20 thanks to the pressurising member 22 and to the system for regulating the flow rate 24 of the secondary tank 20. We shall see in what follows that this adjustment of the flow rate of the fuel during a first injection phase will then make it possible to adjust the injection time of the water into the engine 2.

Then, during a third step, when it is desired to inject the water from the reservoir 30 into the main stream of fuel, the selection valve 36 is placed in its second configuration, wherein the second orifice 36*b* is closed, with the filling valve 34 remaining in its second configuration (FIG. 1*c*). The reservoir 30 is therefore in fluidic communication with both the secondary tank 20 and the injection system 40. As the secondary tank 20 is under pressure (of a magnitude of 0 to 7 bars, for example about 6 bars), fuel coming from the tank pushes the water in the reservoir 30 through the selection valve 36 to the injection system 40. The water is then injected into the main fuel valve.

During this water injection phase, the water of the reservoir 30 is pushed by the fuel coming from the secondary tank 20 to the selection valve 36 and the injection system 40. Consequently, at the end of the water injection phase, the reservoir 30 is filled with fuel, in such a way that the injection system 40 injects into the main stream fuel coming from the secondary tank 20 via the reservoir 30. Thanks to the flowmeter 24, which makes it possible to verify that a flow rate continues to be injected into the main stream of fuel, this system therefore makes it possible to guarantee that all of the water comprised in the reservoir 30 (and the lines) is injected by the injection system 40 into the main stream of fuel. As the volume of water of the reservoir is well determined, the volume of water injected by the injection system is therefore controlled.

Note furthermore that during the change in configuration, the injection into the main stream of fuel is not interrupted, as the switching of the selection valve 36 is very fast. Moreover, given the small diameter of the injection nozzle 42, the change in density due to the injection of the water is not notable.

The selection valve 36 can then be put back into its first configuration, wherein the third orifice 36*c* is closed, in order to switch back the injection on the circuit of the secondary tank 20 (FIG. 1*b*). The reservoir 30 is then completely filled with fuel (and can no longer be emptied via the selection valve 36), while the injection system 40 injects fuel coming from the secondary tank 20 into the main stream of fuel.

The reservoir 30 can then be filled for the purpose of another injection of water into the stream of fuel. For this, as has been shown hereinabove, the filling valve 34 and the selection valve 36 are put back into their first configuration (FIG. 1*a*), and the valve 31 is open. Since water has a higher density than the fuel, the water coming from the water reserve pushes the fuel back to the source of ambient pressure P0 towards which it is evacuated, and fills the reservoir 30 in accordance with the principle of communicating compartments.

The device 1 is therefore again ready to inject water into the main stream of fuel.

Optionally, when the tests are completed, the injection of fuel or of water can be stopped thanks to a cut-off valve, which can for example be arranged between the injection system 40 and the selection valve 36, and which can be closed in order to prevent the secondary tank 20 from emptying into the pipe 3.

As has been shown hereinabove, the pressure of the secondary tank 20 and the flow rate of the fuel at the outlet of the system for regulating the flow rate 20 of the secondary tank 20 are adjusted taking the density of the water into account in such a way that the injection time of the water of the reservoir 30 is very short. All of the volume of water can as such be injected in a determined limited time, preferably between 13 and 21 seconds.

Indeed, the water is pushed by the fuel in the reservoir 30 in the direction of the injection system 40, in such a way that its flow rate at the outlet of the injection nozzle 42 depends on the flow rate of the fuel of the secondary tank 20. However the flow rate of the fuel of the secondary tank 20 can be adjusted during the first step of cooling the fuel of the main tank by regulating the pressure and the flow rate of the secondary tank 20 thanks to the system for regulating the flow 24. As such, for a pressure of the secondary tank 20 of a magnitude of 6 bars, a flow rate of a magnitude of 12 to 30 kg/h, a volume of water of a magnitude of 90 milliliters in the reservoir 30, and a diameter of the injection nozzle 42 of a magnitude of 0.7 millimeters, the injection time of the water by the injection nozzle 42 is less than 21 seconds In order to adjust the various parameters of the test (pressure of the secondary tank 20, the flow rate of the fuel at the outlet of the secondary tank 20, temperature of the fuel of the main tank 10, volume of water injected, injection time of the water, quality of the ice slurry (composition, size of the crystals), etc.) to the type of engine that is tested, without damaging the engine 2, the device 1 can furthermore comprise a system for evaluating 50 the ice slurry formed in the pipe 3 during the injection of the water. This evaluation system 50 has for function to evaluate the quantity of water effectively received by the engine as well as the quality of the ice slurry formed, in order to be able to adjust the quantity of water to be injected and its flow rate.

For this, the evaluation system 50 can for example be arranged in the pipe 3, downstream of the injection nozzle 42 in the direction of the flow of the main stream of fuel, for example on the inlet of the engine 2, and comprise at least one filter 52 designed to filter the ice slurry and allow the remainder of the fuel to pass to the engine 2, and a container for collecting 54, designed to recover the ice slurry separated from the rest of the fuel by the filter. In this way, during the step of adjusting the parameters, the engine 2 is not damaged by the repeated presence of an ice slurry in the fuel. Moreover, the system makes it possible to control the quantity of water that will be received by the engine 2, and its injection time.

The ice slurry accumulated in the filter 52 of the device 1 comprises approximately 50% water and 50% fuel, and is generated by the spraying of the water by the injection system 40 into the main stream of fuel. Indeed, the volumetric fraction of the water during the injection is of a magnitude of 10,000 ppm, but the particles of ice have a porosity of 50%, which increases the effective volume of the solid phase.

Thanks to the filter 14 of the main tank 10, the water recovered in the collection container 54 substantially comprises only the water from the reservoir 30 of water, which makes it possible to determine the quantity of water "lost" during the test, in particular via dilution in the fuel.

The filter 52 can indifferently be a filter from 3 microns to 25 microns. The Applicant indeed noticed that these filters were able to recover the same quantity of ice slurry during the tests.

The container for recovering fluids 54 can be a cylinder, which can be graduated in order to simplify the measurement of the volume of water recovered. The cylinder 54 can furthermore have a generally tapered shape, in order to guarantee the recovery of all of the ice slurry recovered by the filter 52 of the device 1. The volume of the cylinder is moreover chosen in such a way as to be able to receive all of the ice slurry, which has a volume 8 to 10 times greater than the volume of the water injected.

The ice slurry is then heated in the cylinder 54 in order to liquefy its solid phase (crystals) and to determine the volume of water recovered. For this, the cylinder 54 can be placed in ambient temperature or heated.

Once all of the parameters have been adjusted, it is then possible to remove the evaluation system 50 and to reiterate the tests by injecting the ice slurry directly into the engine 2.

Figure 2:
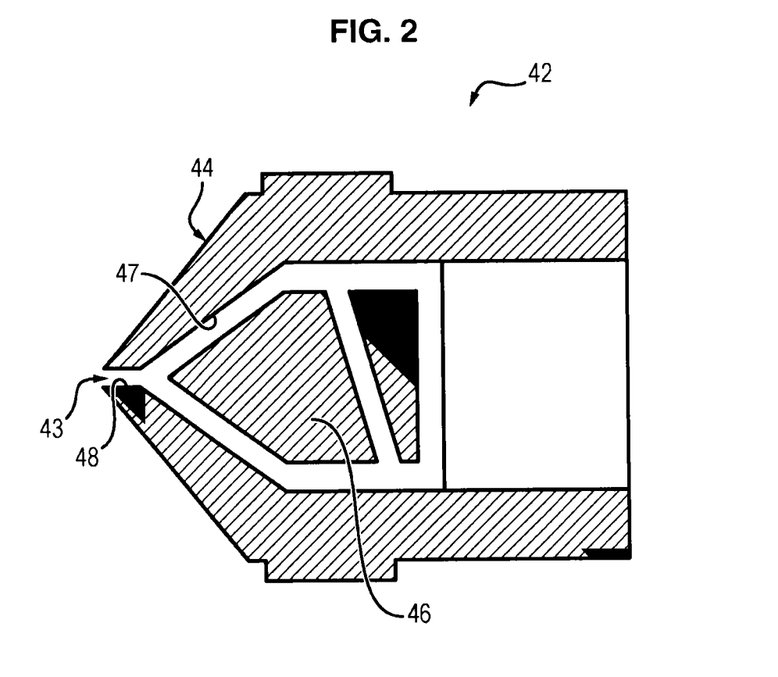
FIG. 2 is an embodiment of an injection nozzle that can in particular be used in a device in accordance with the invention.

In order to spray the water into the main stream of fuel, it is possible to use a conventional injection nozzle 42 comprising an injection head 44 of a generally flat shape and having at its centre an injection orifice 43, and a turbulator 46, housed in the injection head 44 in the vicinity of the orifice 43. The turbulator 46 has for function to increase the turbulence of the flow of the water and to increase the effectiveness of the heat exchanges before its injection into the stream of fuel by the injection nozzle 40, in order to obtain on the inlet of the engine 2 an ice slurry of good quality, i.e. composed of 50% water and 50% fuel, and of which the crystals are of small diameter, i.e. less than about two millimeters. However, the recirculation zones generated in the stream of fuel by the turbulator 46 and the small size of the droplets of water favour a deposit of ice on the head 44 of the nozzle 42. This phenomenon has for consequence to reduce the quantity of water effectively received at the inlet of the engine 2, and can lead to the obstruction of the injection orifice 43 of the nozzle 42 according to the flow rate and the temperature of the water and of the fuel. The quantity of water effectively received at the inlet of the engine 2 is therefore very difficult to quantify, which makes the tests difficult to carry out.

In order to reduce the quantity of ice formed on the head 44 of the nozzle 42, it is possible to use an injection nozzle 42 that does not include a turbulator 46. Nevertheless, the size of the particles in the ice slurry is more substantial, in such a way that the quality of the ice slurry obtained is not satisfactory.

Consequently a new embodiment of the injection nozzle is proposed, that makes it possible to reduce the formation of ice on the head of the nozzle, while still spraying enough water into the main stream of fuel in order obtain an ice slurry of good quality. For this, it is proposed to retain the turbulator 46 and to modify the shape of the head 44 of the injection nozzle 42 in such a way as to limit the geometric rupture making it possible to reduce, and even prevent the formation of ice on the latter despite the turbulences in the stream of fuel. For this, the injection nozzle 42 can for example have a head 44 of tapered shape.

For example, the angle at the top of the cone of the head 44 can be between 30° and 60°, for example of a magnitude of 45°.

Moreover, the outlet of the turbulator 46 must more preferably be placed at at least one millimeter from the injection orifice 43, in order to be able to spray the injected water into the main stream of fuel. For this, the turbulator 46 can for example be placed in abutment against a wall 47 on an inner space of the head 44 of the nozzle, in such a way as to be separated from the injection orifice 43 by an injection channel 48 having a defined length, for example about one millimeter, through which it sends water into the stream of fuel. For example, the wall 47 of the inner space can have a generally tapered shape, of which the top opens onto the injection channel 48. The angle at the top of the tapered wall 47 of the inner space is furthermore preferably less than the angle at the top of the cone of the head 44 of the nozzle.

Tests have shown that an injection nozzle 42 having a head 44 with a tapered shape and a turbulator positioned at at least one millimeter from the injection orifice 43 made it possible to obtain an ice slurry with fine particles and to reduce, and even cancel, the adherence of the ice on the head 44 of the nozzle 42 during tests. It is therefore now possible to quantify with precision the volume of water to be injected into the stream of fuel in order to obtain a determined volume of water at the inlet of the engine, in that the water injected by the injection nozzle 42 no longer is attached on the walls of the head 44, regardless of the flow rate and the temperature of the water and of the fuel.

The device as such makes it possible to form a main stream of fuel at a temperature between −5° and −45° that has a flow rate between 1000 and 3500 kg/h in a line opening at the inlet of an engine 2, and to inject therein a defined volume of water, between 30 milliliters and 400 milliliters, during a limited injection time, for example between 13 and 21 seconds, without oscillation of the injection flow rate. Moreover, the implementing in the injection system 40 of an injection nozzle 42 having a head 44 of tapered shape and a turbulator 46 positioned at least one millimeter from the injection orifice 43 makes it possible to generate very fine droplets of water and to obtain an ice slurry of good quality, of which the crystals are of small diameter, i.e. of a diameter less than 2 millimeters.

The invention claimed is:

1. A device for simulating an ingestion of chunks of ice by an engine, comprising:
   a main tank forming a cavity for a fuel, and connected to an inlet of the engine by a pipe;
   a cooling device for cooling the fuel in the main tank provided to the engine;
   an injection system, comprising an injector arranged in the pipe;
   a secondary tank forming a cavity for a fuel, connected to the injection system by a selector; and
   a reservoir connected to a water reserve and to the injection system by the intermediary of the selector;
   wherein the selector is configured to place the injection system selectively in communication with the secondary tank or the reservoir to inject a determined quantity of water into the pipe so as to form an ice slurry with the cooled fuel from the main tank provided to the engine via the pipe.

2. A device according to claim 1, wherein the secondary tank is connected to a pressurizing member.

3. A device according to claim 1, further comprising a system for regulating a flow rate of fuel between the secondary tank and the selector.

4. A device according to claim 1, wherein the selector comprises a three-way valve that comprises three orifices, a first orifice being connected to the injection system, a second orifice being connected to the secondary tank, and a third orifice being connected to the reservoir.

5. A device according to claim 1, wherein the water reserve is subjected to a determined pressure, and further comprising a filling member configured to connect the reservoir to a source of the determined pressure.

6. A device according to claim 5, wherein the filling member is further in communication with the secondary tank and is configured to place the reservoir selectively in communication with the source of determined pressure or the secondary tank.

7. A device according to claim 5, wherein the filling member comprises a three-way valve which comprises three orifices, a first orifice being connected to the source of determined pressure, a second orifice being connected to the secondary tank, and a third orifice being connected to the reservoir.

8. A device according to claim 5, further comprising a valve arranged between the reservoir and the water reserve, configured to allow or prohibit circulation of water between the water reserve and the reservoir.

9. A device according to claim 1, further comprising a system for evaluating the water injected into the pipe and arriving at the inlet of the engine.

10. A device according to claim 9, wherein the evaluation system comprises a filter arranged on the inlet of the engine configured to recover the water injected into the pipe.

11. A device according to claim 9, further comprising a container for recovering the water injected into the pipe.

12. A device according to claim 1, wherein the injection system comprises an injection nozzle comprising an injection head with a flat tapered shape and having at its center an injection orifice, and a turbulator.

13. A device according to claim 12, wherein the turbulator is placed in abutment against a wall of an inner space of the injection head, and is separated from the injection orifice by an injection channel.

14. A device according to claim 13, wherein the wall of the inner space is of tapered shape.

\* \* \* \* \*